United States Patent
Lappalainen et al.

(10) Patent No.: US 12,342,232 B2
(45) Date of Patent: Jun. 24, 2025

(54) METHOD TO DETECT AND PRIORITIZE CLOSED ACCESS GROUP MOBILE IAB CELLS

(71) Applicant: Nokia Technologies Oy, Espoo (FI)

(72) Inventors: Andrew Lappalainen, Murray Hill, NJ (US); Ilkka Antero Keskitalo, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/889,573

(22) Filed: Sep. 19, 2024

(65) Prior Publication Data

US 2025/0106716 A1    Mar. 27, 2025

Related U.S. Application Data

(60) Provisional application No. 63/539,840, filed on Sep. 22, 2023.

(51) Int. Cl.
*H04W 36/08* (2009.01)
*H04W 36/00* (2009.01)

(52) U.S. Cl.
CPC ..... *H04W 36/08* (2013.01); *H04W 36/00835* (2018.08)

(58) Field of Classification Search
CPC ............. H04W 36/08; H04W 36/0061; H04W 36/0072; H04W 36/00835; H04W 36/0077; H04W 36/008355; H04W 36/00837; H04W 36/0058; H04W 36/0033; H04W 36/0055; H04W 36/0085; H04W 36/16; H04W 36/24; H04W 36/36; H04W 36/0005; H04W 36/005; H04W 36/13;
(Continued)

(56) References Cited

U.S. PATENT DOCUMENTS

2021/0092725 A1* 3/2021 Park .................. H04W 76/27
2021/0400552 A1* 12/2021 Shih .................. H04W 76/11
2021/0410033 A1* 12/2021 Fu .................... H04W 8/186
(Continued)

OTHER PUBLICATIONS

"Updated WID on Architecture Enhancements for Vehicle Mounted Relays (VMR)", TSG SA Meeting #SP-99, SP-230105, Mar. 21-24, 2023, 4 pages.
(Continued)

*Primary Examiner* — Allahyar Kasraian
(74) *Attorney, Agent, or Firm* — Nokia Technologies Oy

(57) ABSTRACT

In accordance with example embodiments of the invention there is at least a method and apparatus to perform determining by an apparatus information of a list of ranges in a communication network where at least one closed access group cell may be found and where at least one mobile integrated access and backhaul cell may be found; scanning synchronization signal blocks for physical cell identifiers of a candidate cell that are found in both at least one system information block closed access group list or range and at least one system information block mobile integrated access and backhaul list or range; based on the scanning, decoding system information at the candidate cell to verify that the candidate cell is a mobile integrated access and backhaul cell and a closed access group cell; and based on the decoding, enable the apparatus to access the candidate cell for cell reselection.

18 Claims, 4 Drawing Sheets

(58) Field of Classification Search
CPC . H04W 36/0083; H04L 5/0048; H04L 5/0051
See application file for complete search history.

(56) References Cited

U.S. PATENT DOCUMENTS

| | | | | |
|---|---|---|---|---|
| 2022/0007211 | A1* | 1/2022 | Akl | H04W 48/12 |
| 2023/0047987 | A1* | 2/2023 | Tseng | H04W 36/08 |
| 2023/0309172 | A1* | 9/2023 | Zhu | H04W 40/34 |

OTHER PUBLICATIONS

"New WID on Mobile IAB", 3GPP TSG RAN Meeting #97, RP-222671, Agenda: 9.3.3.3, Qualcomm, Sep. 12-16, 2022, 6 pages.
"CAG application for MBSR", 3GPP TSG-WG SA2 Meeting #158, S2-2309999, Aug. 21-25, 2023, 2 pages.
"Agenda", 3GPP TSG-RAN WG2 Meeting #123, R2-2xxxxxx, RAN2 Chairman (MediaTek), Aug. 21-25, 2023, 122 pages.
"Report of 3GPP TSG RAN WG2 meeting #121, Athens, Greece", 3GPP TSG-RAN WG2 meeting #121bis-e, R2-2302401, Agenda: 2.2, Etsi Mcc, Feb. 27-Mar. 3, 2023, pp. 1-332.
"Autonomous search for mobile IAB cells", 3GPP TSG-RAN WG2 Meeting #122, R2-2305054, Agenda: 7.12.2.2, Nokia, May 22-26, 2023, 2 pages.
"Running CR for the RedCap Wi", 3GPP TSG-RAN2 Meeting #116bis-e, R2-220xxxx, Ericsson, Jan. 17-25, 2022, pp. 1-53.
"3rd Generation Partnership Project; Technical Specification Group Radio Access Network; NR; Radio Resource Control (RRC) protocol specification (Release 18)", 3GPP TS 38.331, V18.1.0, Mar. 2024, pp. 1-1649.
"3rd Generation Partnership Project; Technical Specification Group Radio Access Network; NR;User Equipment (UE) procedures in Idle mode and RRC Inactive state (Release 18)", 3GPP TS 38.304, V18.1.0, Mar. 2024, pp. 1-56.
"3rd Generation Partnership Project; Technical Specification Group Services and System Aspects; System architecture for the 5G System (5GS); Stage 2 (Release 18)", 3GPP TS 23.501, V18.5.0, Mar. 2024, pp. 1-716.
"3rd Generation Partnership Project; Technical Specification Group Radio Access Network; NR; Requirements for support of radio resource management (Release 18)", 3GPP TS 38.133, V18.5.0, Mar. 2024, pp. 1-6542.
"3rd Generation Partnership Project; Technical Specification Group Radio Access Network; NR; NR and NG-RAN Overall Description; Stage 2 (Release 18)", 3GPP TS 38.300, V18.1.0, Mar. 2024, pp. 1-265.
"Resolving open issues for cell reselection", 3GPP TSG-RAN2 #124, R2-2313305, Agenda: 7.12.2.4, LG Electronics Inc., Nov. 13-17, 2024, pp. 1-14.
"Introduction of mobile IAB for Nr", 3GPP TSG-RAN WG2 Meeting #124, R2-2313678, 17.6.0, Intel Corporation, Nov. 13-17, 2023, 8 pages.
"Introduction of mobile IAB", 3GPP TSG-RAN WG2 Meeting #124, R2-2313671, Ericsson, Nov. 13-17, 2023, pp. 1-1317.
International Search Report and Written Opinion received for corresponding Patent Cooperation Treaty Application No. PCT/EP2024/073409, dated Nov. 29, 2024, 15 pages.
"Idle mode mobility enhancement related to mIAB", 3GPP TSG-RAN2 #121bis, R2-2303845, Agenda: 7.12.2, LG Electronics Inc., Apr. 2023, 15 pages.
"UE cell (re)selection towards mobile IAB cell", 3GPP TSG RAN WG2 Meeting #122, R2-2305499, Agenda: 7.12.2.2, Intel Corporation, May 22-26, 2023, 7 pages.
"Cell reselection issues for UEs in mobile IAB scenarios", 3GPP TSG-RAN WG2 Meeting #124, R2-2313199, Agenda: 7.12.2.4, Nokia, Nov. 13-17, 2023, 4 pages.
"Idle/Inactive mode mobility enhancements for mobile Iab", 3GPP TSG-RAN WG2 #123-bis, R2-2311067, Agenda: 7.12.2.2, Kyocera, Oct. 9-13, 2023, 8 pages.

* cited by examiner

410: determining by an apparatus information of a list of ranges in a communication network where at least one closed access group cell may be found and where at least one mobile integrated access and backhaul cell may be found;

420: scanning synchronization signal blocks for physical cell identifiers of a candidate cell that are found in both at least one system information block closed access group list or range and at least one system information block mobile integrated access and backhaul list or range;

430: based on the scanning, decoding system information at the candidate cell to verify that the candidate cell is a mobile integrated access and backhaul cell and a closed access group cell;

440: based on the decoding, enabling the apparatus to access the candidate cell for cell reselection

FIG. 4

METHOD TO DETECT AND PRIORITIZE CLOSED ACCESS GROUP MOBILE IAB CELLS

TECHNICAL FIELD

The teachings in accordance with the exemplary embodiments of this invention relate generally to reducing a set of cells over which a UE searches and, more specifically, relates to reducing a set of cells over which a UE searches for Mobile IAB and CAG cells for cell reselection prioritization.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
- AS Access Stratum
- CAG Closed Access Group
- IAB Integrated Access and Backhaul
- MBSR Mobile Base Station Relay
- NAS Non-Access Stratum
- PLMN Public Land Mobile Network
- PNI-NPN Public Network Integrated Non-Public Network
- PCI Physical Cell Identifier
- SIB System Information Block
- SSB Synchronization Signal Block
- UE User Equipment
- Vehicle Mounted Relay VMR In certain urban environments, installing additional base stations on buildings or other infrastructure sites may face typical deployment challenges and burdens, such as real estate availability and costs, or constraining regulations. In the same urban environments, in conjunction with the high density of users, one can also expect the presence and availability of many vehicles around, e.g., for public/private passengers transportation, goods delivery, food trucks etc, typically moving at low/pedestrian speed (or temporarily stationary).

Those vehicles would indeed offer a convenient and efficient place in which to install on board base stations (or base station elements) acting as relays, for providing 5G coverage and connectivity to neighbouring UEs outside the vehicle. The relay will use 5G wireless backhaul toward the macro network (stationary donor base stations) connected to the 5G core . . . . In other scenarios, e.g., during an outdoor sport race or pedestrian events, vehicles equipped with relays could conveniently move along with users or devices that are outside the vehicle and provide service to them. In some cases, e.g., during medical emergencies or when an area lacks sufficient coverage, vehicle relays can enable improved connectivity and data delivery.

At the time of this application corresponding architecture enhancement studies (FS_VMR), are focusing on areas including:

provisioning, policies and mechanisms to e.g., manage relay configuration, geographic restrictions, QoS, authorize and control of UEs' access via the mobile base station relay, etc.;

support for roaming of mobile base station relay (including the roaming of MT and DU components), support for regulatory requirements (e.g., emergency, priority services, public safety), and support for location services for UEs accessing mobile base station relay.

Example embodiments of this invention proposes improved operations for enhancements to support control of UEs' access to mobile base station relays including using closed access group (CAG) cells and/or an enhanced mechanisms similar to CAG.

SUMMARY

This section contains examples of possible implementations and is not meant to be limiting.

In another example aspect of the invention, there is an apparatus, such as a user equipment side apparatus, comprising: at least one processor; and at least one non-transitory memory storing instructions, that when executed by the at least one processor, cause the apparatus at least to: determine by an apparatus information of a list of ranges in a communication network where at least one closed access group cell may be found and where at least one mobile integrated access and backhaul cell may be found; scan synchronization signal blocks for physical cell identifiers of a candidate cell that are found in both at least one system information block closed access group list or range and at least one system information block mobile integrated access and backhaul list or range; and based on the scanning, decode system information at the candidate cell to verify that the candidate cell is a mobile integrated access and backhaul cell and a closed access group cell; and based on the decoding, enable the apparatus to access the candidate cell for cell reselection.

In still another example aspect of the invention, there is a method, comprising: determining by an apparatus information of a list of ranges in a communication network where at least one closed access group cell may be found and where at least one mobile integrated access and backhaul cell may be found; scanning synchronization signal blocks for physical cell identifiers of a candidate cell that are found in both at least one system information block closed access group list or range and at least one system information block mobile integrated access and backhaul list or range; and based on the scanning, decoding system information at the candidate cell to verify that the candidate cell is a mobile integrated access and backhaul cell and a closed access group cell; and based on the decoding, enabling the apparatus to access the candidate cell for cell reselection.

A further example embodiment is an apparatus and a method comprising the apparatus and the method of the previous paragraphs, wherein the determining is based on a broadcast of the information in at least one system information block from a cell of the communication network, wherein the scanning comprises scanning synchronization signal blocks for physical cell identifiers of the candidate cell that are found in both at least one system information block neighbour cell list or range in an intersection of a set C3 or set C4 and a set M3 or set M4, wherein based on an intrafrequency or interfrequency neighbouring physical cell identifier list or range: C4 denotes a list, range, or list of ranges of interfrequency neighbouring closed access group cells; and M4 denotes a list, range, or list of ranges of interfrequency neighbouring mobile integrated access and backhaul cells, wherein the scanning is performed for physical cell identifiers in the intersection of C4 and M4, wherein based on an intrafrequency or interfrequency neighbouring physical cell identifier list or range: C3 denotes a list, range, or list of ranges of intrafrequency neighbouring closed access group cells; and M3 denotes a list, range, or list of ranges of intrafrequency neighbouring mobile integrated access and backhaul cells, wherein the scanning is performed for physical cell identifiers in the intersection of C3 and M3, wherein the apparatus is configured by the communication network with the one or more closed access group identifiers, wherein there is, based on the scanning, determining a cell of the communication network as a candidate cell with system information to be decoded, wherein there is, based on the determining, receiving from a cell of the communication network at least one system information block indicating the cell is a closed access group cell and a mobile integrated access and backhaul cell, wherein there is, based on the receiving: decoding a system information block 1; detecting a cell of the communication network as a closed access group cell and mobile integrated access and backhaul cell in the list of ranges in the communication network; verify that the closed access group identity of the detected cell is in a configured set of closed access group list or range of the apparatus; and based on the verifying, reselecting a cell of the communication network, wherein the reselecting is not taking into account a dedicated frequency priority of the cell.

A non-transitory computer-readable medium storing program code, the program code executed by at least one processor to perform at least the method as described in the paragraphs above.

In yet another example aspect of the invention, there is an apparatus comprising: means for determining by an apparatus information of a list of ranges in a communication network where at least one closed access group cell may be found and where at least one mobile integrated access and backhaul cell may be found; means for scanning synchronization signal blocks for physical cell identifiers of a candidate cell that are found in both at least one system information block closed access group list or range and at least one system information block mobile integrated access and backhaul list or range; and means, based on the scanning, for decoding system information at the candidate cell to verify that the candidate cell is a mobile integrated access and backhaul cell and a closed access group cell; and means, based on the decoding, for enabling the apparatus to access the candidate cell for cell reselection.

In accordance with the example embodiments as described in the paragraph above, at least the means for determining, scanning, and decoding comprises a network interface, and computer program code stored on a computer-readable medium and executed by at least one processor.

A communication system comprising the apparatus as a network side apparatus or a user equipment side apparatus performing operations as described above.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 4 shows a method in accordance with example embodiments of the invention which may be performed by an apparatus.

DETAILED DESCRIPTION

Figure 1:
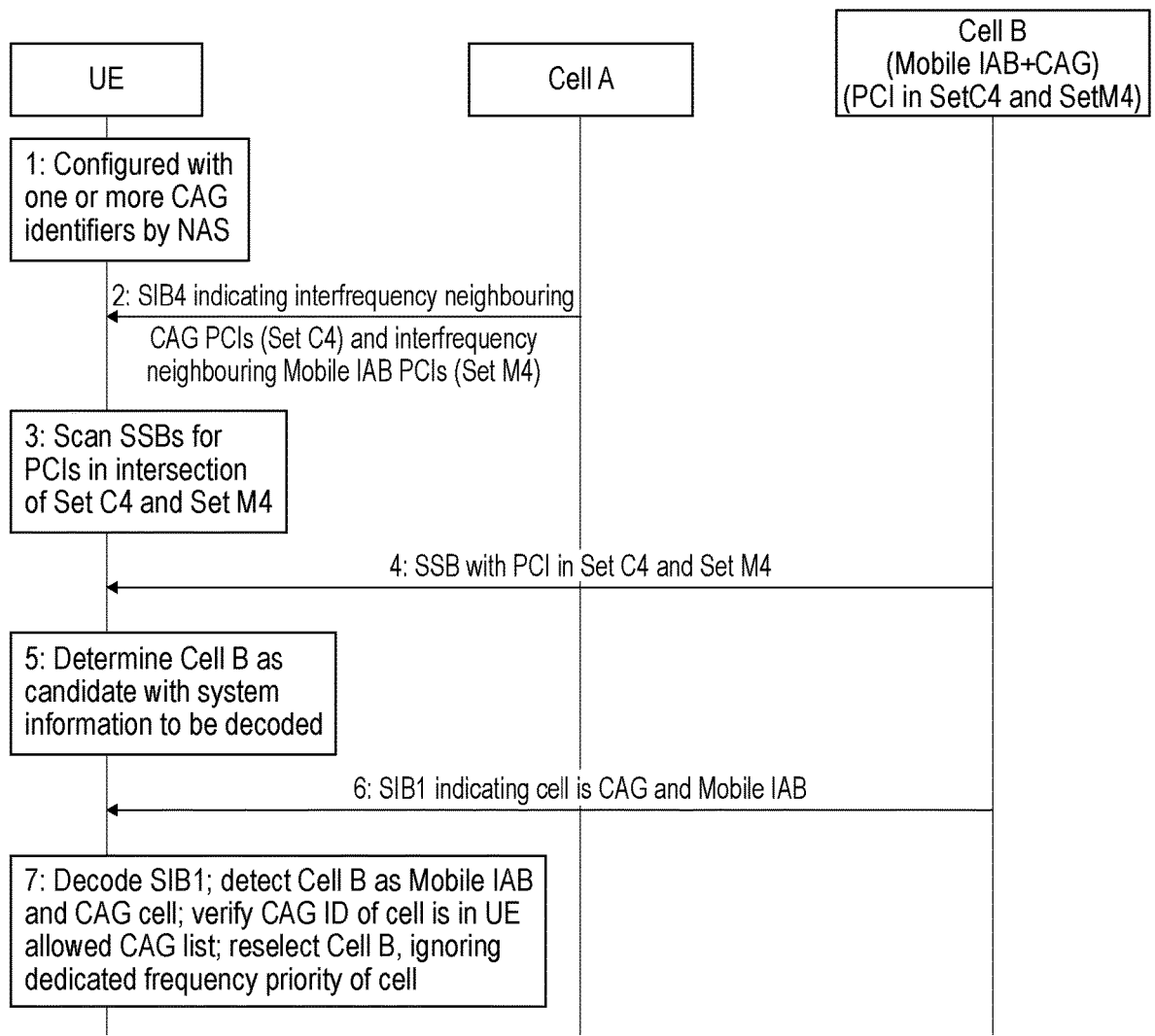
FIG. 1 shows detection and prioritization of Mobile IAB+CAG cells using SIB4 assistance information in accordance with example embodiments of the invention.

In example embodiments of this invention there is proposed at least a method and apparatus for reducing a set of cells over which a UE searches for Mobile IAB and CAG cells for cell reselection prioritization.

Mobile IAB (Integrated Access and Backhaul), MBSR (Mobile Base Station Relay), VMR (Vehicle Mounted Relay), Closed Access Group (CAG)

Example embodiments of the invention relate to standards based Mobile Integrated Access and Backhaul (Mobile IAB) including Vehicle Mounted Relay (VMR) (also called Mobile Base Station Relay (MBSR)).

Following is the relevant background from standards on VMR and/or Mobile IAB:

Enhancements for mobility of an IAB-node together with the served UEs, including aspects related to group mobility. No optimizations for the targeting of surrounding UEs. [RAN3, RAN2].

Background on the Closed Access Group (CAG) Concept:

Public Network Integrated NPNs are NPNs [non-public networks] made available via PLMNs e.g., by means of dedicated DNNs, or by one (or more) Network Slice instances allocated for the NPN. Presently, the existing network slicing functionalities apply. When a PNI-NPN is made available via a PLMN, then the UE shall have a subscription for the PLMN in order to access PNI-NPN.

It is noted that as network slicing does not enable the possibility to prevent UEs from trying to access the network in areas where the UE is not allowed to use the Network Slice allocated for the NPN, Closed Access Groups may optionally be used to apply access control.

A Closed Access Group identifies a group of subscribers who are permitted to access one or more CAG cells associated to the CAG.

CAG is used for the PNI-NPNs to prevent UE(s), which are not allowed to access the NPN via the associated cell(s), from automatically selecting and accessing the associated CAG cell(s).

Based on standards at the time of this application the following is required for identification:

A CAG is identified by a CAG Identifier which is unique within the scope of a PLMN ID; and A CAG cell broadcasts one or multiple CAG Identifiers per PLMN.

More background on CAG is found in TS 23.501 section 5.30.3. Details related to UE reselection of CAG cells are specified in TS 38.304, and the relevant access stratum (AS) CAG indications from the network to the UE are specified in TS 38.331.

In standards at the time of this application it has been agreed to use CAG as a way control UE access to MBSR.

Presently, CAG Identifier is used to control the access of UE via MBSR (i.e., mobile IAB-node) and existing CAG mechanism can be used for managing UE's access to MBSR, with the following additional considerations:

When the MBSR is allowed to operate as an IAB node for a PLMN, the MBSR is configured, either during the communication with the serving PLMN OAM or (pre-) configuration mechanism, with a CAG identifier which is unique within the scope of this PLMN. If the MBSR is (pre-) configured with the PLMN list in which the MBSR is allowed to operate as MBSR, the corresponding CAG Identifier per PLMN is also configured in the MBSR.

It is noted that the CAG for MBSR is supported as part of the PNI-NPN concept.

NG-RAN and 5GC support the UE access control based on the CAG identifier associated with the MBSR cell and the allowed CAG identifiers for the UE that supports CAG functionality.

For Cell Reselection to CAG Cells, Standards at the Time of the Invention Specify the Following:

In addition to normal cell reselection, a UE may optionally use an autonomous search function to detect CAG cells on serving and non-serving frequencies. However, UE shall follow the cell reselection criteria based on dedicated frequency priorities and only follow the autonomous cell search result if the result fulfils also the existing cell reselection criteria based on dedicated frequency priorities.

Furthermore, standards at the time of the invention show that a cell may broadcast in SIB3 and SIB4, respectively, a list of neighbouring intrafrequency/interfrequency PCIs where CAG cells may be found.

Meanwhile, under standards at the time of the invention there has been discussed UE reselection behaviour toward Mobile IAB cells, and it has been agreed that a UE may prioritize interfrequency reselection toward a Mobile IAB cell (i.e., irrespective of the dedicated frequency priority of the Mobile IAB cell). Under the same agenda item, RAN2 has discussed whether to add new assistance information to the SIB4 message to indicate neighbouring frequencies and/or neighbouring cells where Mobile IAB cells may be found, to assist UEs with searching for Mobile IAB cells for cell reselection. RAN2 has also discussed the addition of a "mobile IAB indication" to the SIB1 message. to let a UE know that a cell is a "Mobile" IAB cell.

Since standards require UEs reselecting CAG cells to follow the dedicated frequency priorities, it was observed that a contradiction/ambiguity could arise if RAN2 agreed to allow UEs to prioritize mobile IAB cells for cell reselection, when those Mobile IAB cells are also configured as CAG cells.

As initially observed, if a mobile IAB cell is configured as a CAG cell, it is unclear whether the requirement in standards with respect to dedicated frequency priorities of CAG cells is still applicable if UEs are also allowed to prioritize Mobile IAB cells.

If UEs are expected to respect dedicated frequency priorities when Mobile IAB cells are configured as CAG cells, this could conflict with the original intended outcome of allowing UEs to prioritize Mobile IAB cells in the first case, for example, in scenarios where a restricted class of UEs are intended to operate on the Mobile IAB node, e.g. in public safety applications, urban air mobility, etc, especially in cases where the dedicated frequency priority of the Mobile IAB CAG cell could be low (e.g. to minimize access from UEs, which are not CAG-capable).

On the other hand, if UEs are simply allowed to ignore dedicated frequency priorities when Mobile IAB nodes are configured as CAG cells this could cause UEs that wish to prioritize Mobile IAB CAG cells to constantly search for and decode the system information of neighbouring cells until they find one meeting the Mobile IAB+CAG condition, which could unnecessarily consume a lot of power at the UE.

Therefore, it would be helpful if UEs wishing to prioritize Mobile IAB+CAG cells for reselection could search over a reduced set of candidate cells, i.e. to only decode the system information of cells that are likely to be Mobile IAB+CAG.

Example embodiments of the invention provide at least a method to reduce the set of cells over which a UE searches for Mobile IAB+CAG cells for cell reselection prioritization.

Figure 3:
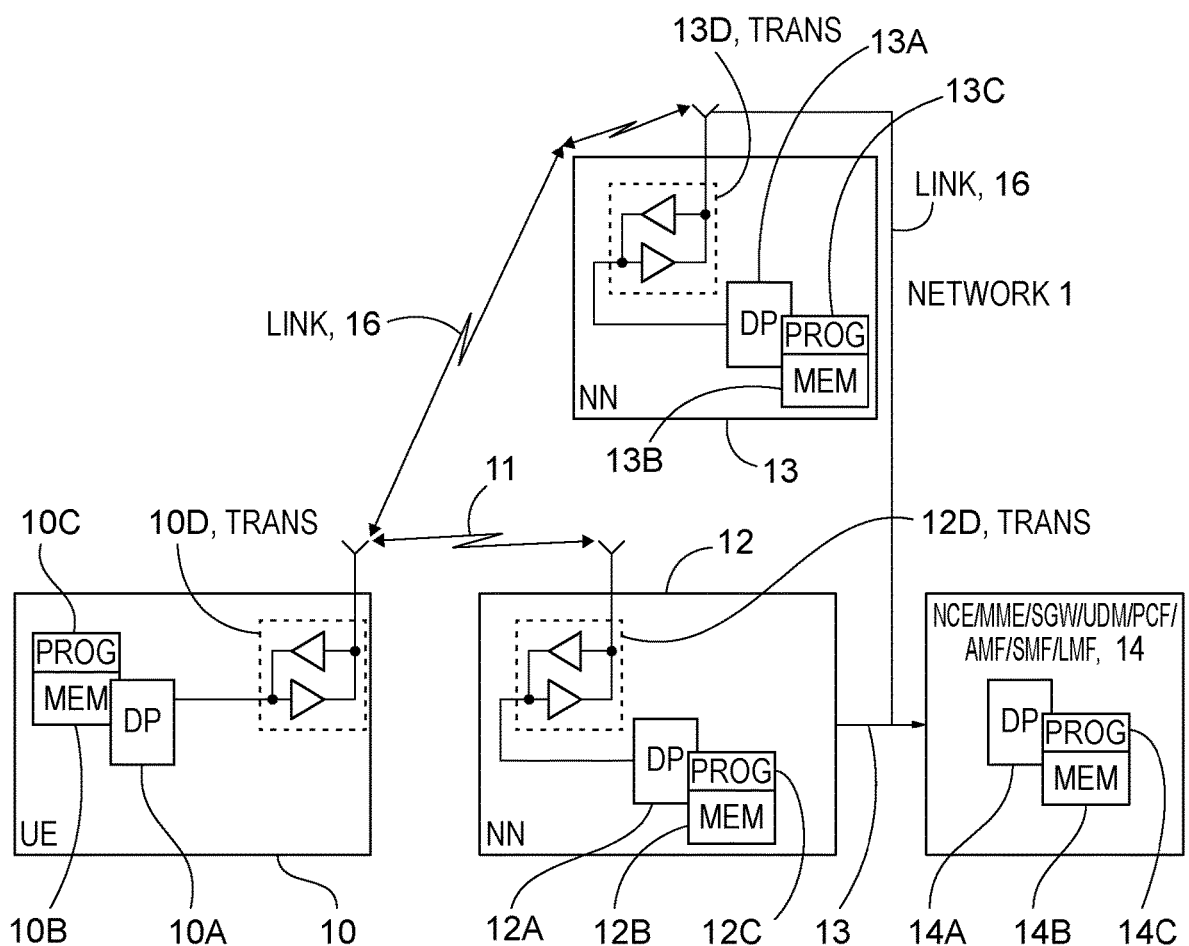
FIG. 3 shows a high level block diagram of various devices used in carrying out various aspects of the invention.

Before describing the example embodiments as disclosed herein in detail, reference is made to FIG. 3 for illustrating a simplified block diagram of various electronic devices that are suitable for use in practicing the example embodiments of this invention.

FIG. 3 shows a block diagram of one possible and non-limiting exemplary system in which the example embodiments may be practiced. In FIG. 3, a user equipment (UE) 10 is in wireless communication with a wireless network 1 or network, 1 as in FIG. 3. The wireless network 1 or network 1 as in FIG. 3 can comprise a communication network such as a mobile network e.g., the mobile network 1 or first mobile network as disclosed herein. Any reference herein to a wireless network 1 as in FIG. 3 can be seen as a reference to any wireless network as disclosed herein. Further, the wireless network 1 as in FIG. 3 can also comprise hardwired features as may be required by a communication network. A UE is a wireless, typically mobile device that can access a wireless network. The UE, for example, may be a mobile phone (or called a "cellular" phone) and/or a computer with a mobile terminal function. For example, the UE or mobile terminal may also be a portable, pocket, handheld, computer-embedded or vehicle-mounted mobile device and performs a language signaling and/or data exchange with the RAN.

The UE 10 includes one or more processors DP 10A, one or more memories MEM 10B, and one or more transceivers TRANS 10D interconnected through one or more buses. Each of the one or more transceivers TRANS 10D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 10D which can be optionally connected to one or more antennas for communication to NN 12. The one or more memories MEM 10B include computer program code PROG 10C. The UE 10 communicates with NN 12 via a wireless link 11 or 16.

The NN 12 (NR/5G Node B, an evolved NB, or LTE device) is a network node such as a master or secondary node base station (e.g., for NR or LTE long term evolution) that communicates with devices such as UE 10 of FIG. 3. The NN 12 provides access to wireless devices such as the UE 10 to the wireless network 1. The NN 12 includes one or more processors DP 12A, one or more memories MEM 12B, and one or more transceivers TRANS 12D interconnected through one or more buses. In accordance with the example embodiments these TRANS 12D can include X2 and/or Xn interfaces for use to perform the example embodiments. Each of the one or more transceivers TRANS 12D includes a receiver and a transmitter. The one or more transceivers TRANS 12D can be optionally connected to one or more antennas for communication over at least link 11 with the UE 10. The one or more memories MEM 12B and the computer program code PROG 12C are configured to cause, with the one or more processors DP 12A, the NN 12 to perform one or more of the operations as described herein. The NN 12 may communicate with another gNB or eNB such as via link 16. Further, the link 11, link 16 and/or any other link may be wired or wireless or both and may implement, e.g., an X2 or Xn interface. Further the link 11 and/or link 16 may be through other network devices such as, but not limited to an NCE/MME/SGW/UDM/PCF/AMF/SMF 14 device as in FIG. 3. The NN 12 may perform functionalities of an MME (Mobility Management Entity) or SGW (Serving Gateway), such as a User Plane Functionality, and/or an Access Management functionality for LTE and similar functionality for 5G.

The LMF 13 (a NR/5G, evolved NB, or LTE device) is a network device such as a device including a location management function device (e.g., for NR or LTE long term evolution) that communicates with devices such the NN 12 and UE 10 of FIG. 3. The LMF 13 can be associated with a mobility function device such as an AMF or SMF, further the LMF 13 may communicate with devices such as the NN 12 and/or UE 10 and/or the wireless network 1. The LMF 13 includes one or more processors DP 13A, one or more memories MEM 13B, one or more network interfaces, and one or more transceivers TRANS 13D interconnected through one or more buses. In accordance with the example embodiments these network interfaces of LMF 13 can include X2 and/or Xn interfaces for use to perform the example embodiments. Each of the one or more transceivers TRANS 13D includes a receiver and a transmitter that can optionally be connected to one or more antennas. The one or more memories MEM 13B include computer program code PROG 13C. For instance, the one or more memories MEM 13B and the computer program code PROG 13C are configured to cause, with the one or more processors DP 13A, the LMF 13 to perform one or more of the operations as described herein. The LMF 13 may communicate with another mobility function device and/or eNB such as the NN 12 and the UE 10 or any other device or the NCE/MME/SGW/UDM/PCF/AMF/SMF 14 using, e.g., link 11 or link 16 or another link. The Link 16 as shown in FIG. 3 can be used for communication between the NN12 and the NN13. These links maybe wired or wireless or both and may implement, e.g., an X2 or Xn interface. Further, as stated above the link 11 and/or link 16 may be through other network devices such as, but not limited to an NCE/MME/SGW device such as the NCE/MME/SGW/UDM/PCF/AMF/SMF 14 of FIG. 3.

The one or more buses of the device of FIG. 3 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D and/or TRANS 10D may be implemented as a remote radio head (RRH), with the other elements of the NN 12 being physically in a different location from the RRH, and these devices can include one or more buses that could be implemented in part as fiber optic cable to connect the other elements of the NN 12 to a RRH.

It is noted that although FIG. 3 shows a network node such as NN 12, this node can incorporate or be incorporated into an eNodeB or eNB or gNB such as for LTE and NR, and would still be configurable to perform example embodiments.

Also it is noted that description herein indicates that "cells" perform functions, but it should be clear that the gNB that forms the cell and/or a user equipment and/or mobility management function device that will perform the functions. In addition, the cell makes up part of a gNB, and there can be multiple cells per gNB.

The wireless network 1 or any network it can represent may or may not include a NCE/MME/SGW/UDM/PCF/AMF/SMF 14 that may include (NCE) network control element functionality, MME (Mobility Management Entity)/SGW (Serving Gateway) functionality, and/or serving gateway (SGW), and/or MME (Mobility Management Entity) and/or SGW (Serving Gateway) functionality, and/or user data management functionality (UDM), and/or PCF (Policy Control) functionality, and/or Access and Mobility Management Function (AMF) functionality, and/or Session Management (SMF) functionality, and/or Location Management Function (LMF), and/or Authentication Server (AUSF) functionality and which provides connectivity with a further network, such as a telephone network and/or a data communications network (e.g., the Internet), and which is configured to perform any 5G and/or NR operations in addition to or instead of other standard operations at the time of this application. The NCE/MME/SGW/UDM/PCF/AMF/SMF 14 is configurable to perform operations in accordance with example embodiments in any of an LTE, NR, 5G and/or any standards based communication technologies being performed or discussed at the time of this application. In addition, it is noted that the operations in accordance with example embodiments, as performed by the NN 12 and/or LMF 13, may also be performed at the NCE/MME/SGW/UDM/PCF/AMF/SMF 14.

The NCE/MME/SGW/UDM/PCF/AMF/SMF 14 includes one or more processors DP 14A, one or more memories MEM 14B, and one or more network interfaces (N/W I/F(s)), interconnected through one or more buses coupled with the link 13 and/or link 16. In accordance with the example embodiments these network interfaces can include X2 and/or Xn interfaces for use to perform the example embodiments. The one or more memories MEM 14B include computer program code PROG 14C. The one or more memories MEM14B and the computer program code PROG 14C are configured to, with the one or more processors DP 14A, cause the NCE/MME/SGW/UDM/PCF/AMF/SMF 14 to perform one or more operations which may be needed to support the operations in accordance with the example embodiments.

It is noted that that the NN 12 and/or LMF 13 and/or UE 10 can be configured (e.g. based on standards implementations etc.) to perform functionality of a Location Management Function (LMF). The LMF functionality may be embodied in any of these network devices or other devices associated with these devices. In addition, functions of an LMF such as the LMF 13 can be co-located with UE 10 such as to be separate from the NN 12 and/or LMF 13 of FIG. 3 for performing operations in accordance with example embodiments as disclosed herein.

The wireless Network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP10, DP12A, DP13A, and/or DP14A and memories MEM 10B, MEM 12B, MEM 13B, and/or MEM 14B, and also such virtualized entities create technical effects.

The computer readable memories MEM 12B, MEM 13B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 12B, MEM 13B, and MEM 14B may be means for performing storage functions. The processors DP10, DP12A, DP13A, and DP14A may be of any type suitable to the local technical environment, and may include one or more of general purpose computers, special purpose computers, microprocessors, digital signal processors (DSPs) and processors based on a multi-core processor architecture, as non-limiting examples. The processors DP10, DP12A, DP13A, and DP14A may be means for performing functions, such as controlling the UE 10, NN 12, LMF 13, and other functions as described herein.

In general, various embodiments of any of these devices can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Further, the various embodiments of any of these devices can be used with a UE vehicle, a High Altitude Platform Station, or any other such type node associated with a terrestrial network or any drone type radio or a radio in aircraft or other airborne vehicle or a vessel that travels on water such as a boat.

As similarly stated above, Example embodiments of the invention provide at least a method to reduce the set of cells over which a UE searches for Mobile IAB+CAG cells for cell reselection prioritization. Some distinguishing features are underlined below.

It is assumed that the UE has already been configured with a set of one or more CAG identifiers by NAS, which enables the UE to access CAG cells.

The cell broadcasts in SIB4 a list of interfrequency neighbouring PCI ranges where CAG cells may be found. The cell additionally broadcasts in SIB4 a list or range or list of ranges of interfrequency neighbour PCIs where Mobile IAB cells may be found.

The cell broadcasts in SIB3 a list of intrafrequency neighbouring PCI ranges where CAG cells may be found. The cell additionally broadcasts in SIB3 a list or range or list of ranges of intrafrequency neighbour PCIs where Mobile IAB cells may be found.

UE scans SSBs for candidate cell PCIs that are found in the both the SIB4 CAG list/range and the SIB4 Mobile IAB list/range or UE scans SSBs for candidate cell PCIs that are found in the both the SIB3 CAG list/range and the SIB3 Mobile IAB list/range. The UE decodes system information at the candidate cell(s) to verify that the cell is a Mobile IAB cell and a CAG cell. The UE verifies that the CAG identity of the cell is in the set of CAG identifiers that is configured at the UE by NAS that the UE is allowed to access. The UE may prioritize a candidate cell meeting such criteria for cell reselection, ignoring dedicated intrafrequency or interfrequency priorities.

In one possible deployment scenario, a UE access to mobile cells could be limited by CAG allowing only UEs that are subscribed to that particular CAG. The same applies to neighbour cells that can be both mobile and CAG cell which the UE should prioritize re-selections. In this situation the cells where the SI would be decoded are both mIAB and CAG cells.

FIG. 1 shows detection and prioritization of Mobile IAB+CAG cells using SIB4 assistance information in accordance with example embodiments of the invention.

FIG. 1 shows communication between a UE, such as a UE 10 as in FIG. 3, a Cell A, and a Cell B such as NN12 and/or NN13 as in FIG. 3. In FIG. 1 is shown the steps in accordance with example embodiments of the invention involved to enable the UE wishing to prioritize Mobile IAB+CAG for cell reselection to more efficiently search for those cells at interfrequency neighbours (based on SIB4 assistance information).

Figure 2:
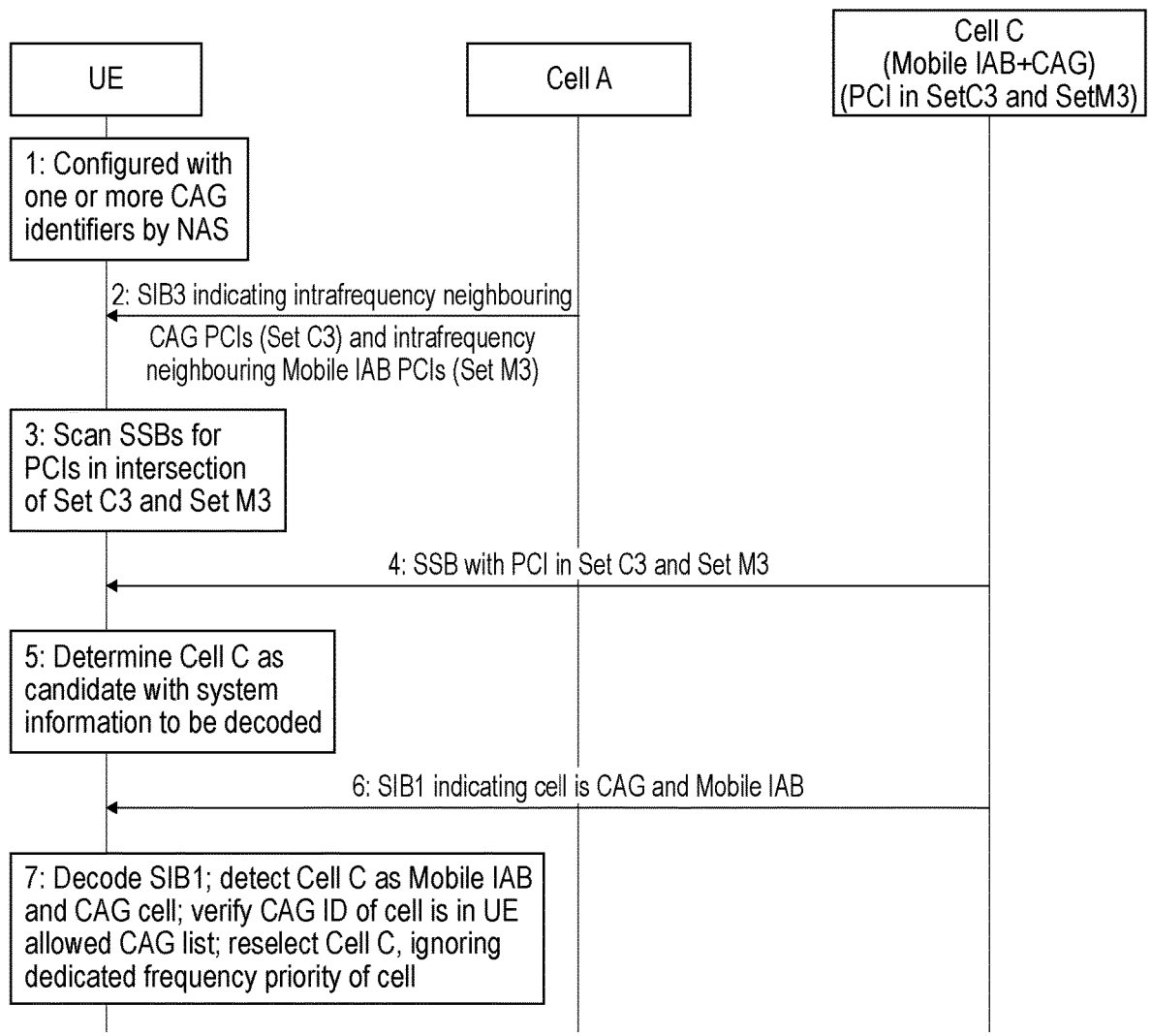
FIG. 2 shows detection and prioritization of Mobile IAB+CAG cells using SIB3 assistance information in accordance with example embodiments of the invention.

FIG. 2 shows detection and prioritization of Mobile IAB+CAG cells using SIB3 assistance information in accordance with example embodiments of the invention.

FIG. 2 also shows communication between a UE, such as a UE 10 as in FIG. 3, a Cell A, and a Cell C such as NN12 and/or NN13 as in FIG. 3. FIG. 2 shows the steps in accordance with example embodiments of the invention involved to enable the UE wishing to prioritize Mobile IAB+CAG for cell reselection to more efficiently search for those cells at intrafrequency neighbours (based on SIB3 assistance information).

It is noted that in accordance with example embodiments of the invention, the deployment does not depend on both SIB4 and SIB3 information being broadcast. Example embodiments of the invention can work with either or both scenarios, such as in FIG. 1 and/or FIG. 2.

It is noted that in FIG. 1 and FIG. 2, the term "set" refers to a list, or a range, or a list of ranges.

As shown in step 1 of FIG. 1 the UE is configured with one or more closed access group (CAG) identifiers by a non-access stratum (NAS). As shown in step 2 of FIG. 1 the UE receives from the Cell A system information block 4 (SIB4) indicating interfrequency neighbouring CAG PCIs (Set C4) and interfrequency neighboring mobile integrated access and backhaul (IAB) physical cell identifiers (PCIs), (set M4). As shown in step 3 of FIG. 1 the UE scans synchronization signal blocks (SSBs) for PCIs in intersection of set C4 and set M4. As shown in step 4 of FIG. 1 the UE receives from the Cell B at least one SSB with PCI in set C4 and set M4. As shown in step 5 of FIG. 1 the UE determines Cell B as a candidate with system information to be decoded. As shown in step 6 of FIG. 1 the UE receives from the Cell B a system information block1 (SIB1) indicating Cell B is a closed access group (CAG) cell and mobile integrated access and backhaul (IAB) cell. Then as shown in step 7 of FIG. 1 the UE decodes SIB1 and detects Cell B as mobile IAB and CAG cell in UE CAG list; reselects Cell B, ignoring dedicated frequency priority of the cell.

As shown in step 1 of FIG. 2 the UE is configured with one or more closed access group (CAG) identifiers by a non-access stratum (NAS). As shown in step 2 of FIG. 2 the UE receives from the Cell A system information block 3 (SIB3) indicating intrafrequency neighbouring CAG PCIs (Set C3) and intrafrequency neighboring mobile integrated access and backhaul (IAB) physical cell identifiers (PCIs), (set M3). As shown in step 3 of FIG. 2 the UE scans synchronization signal blocks (SSBs) for PCIs in intersection of set C3 and set M3. As shown in step 4 of FIG. 1 the UE receives from the Cell B at least one SSB with PCI in set C3 and set M3. As shown in step 5 of FIG. 2 the UE determines Cell B as a candidate with system information to be decoded. As shown in step 6 of FIG. 2 the UE receives from the Cell B a system information block1 (SIB1) indicating Cell B is a closed access group (CAG) cell and mobile integrated access and backhaul (IAB) cell. Then as shown in step 7 of FIG. 2 the UE decodes SIB1 and detects Cell C as mobile IAB and CAG cell in UE CAG list; reselects Cell B, ignoring dedicated frequency priority of the cell.

In accordance with example embodiments of the invention any of the Cell A, Cell B, and/or Cell C can be both or one of closed access group (CAG) cell and/or mobile integrated access and backhaul (IAB) cells. In addition, in accordance with example embodiments of the invention the Cell A, Cell B, and/or Cell C can be none of a closed access group (CAG) cell and/or mobile integrated access and backhaul (IAB) cell.

FIG. 4 shows a method in accordance with example embodiments of the invention which may be performed by an apparatus.

FIG. 4 illustrates operations which may be performed by a device such as, but not limited to, a device such as a network device (e.g., the UE 10 as in FIG. 3). As shown in block 410 of FIG. 4A there is determining by an apparatus information of a list of ranges in a communication network where at least one closed access group cell may be found and where at least one mobile integrated access and backhaul cell may be found. As shown in block 420 of FIG. 4 there is scanning synchronization signal blocks for physical cell identifiers of a candidate cell that are found in both at least one system information block closed access group list or range and at least one system information block mobile integrated access and backhaul list or range. As shown in block 430 of FIG. 4 there is, based on the scanning, decoding system information at the candidate cell to verify that the candidate cell is a mobile integrated access and backhaul cell and a closed access group cell. Then as shown in block 440 of FIG. 4 there is, based on the decoding, enabling the apparatus to access the candidate cell for cell reselection.

In accordance with the example embodiments as described in the paragraph above, wherein the determining is based on a broadcast of the information in at least one system information block from a cell of the communication network.

In accordance with the example embodiments as described in the paragraphs above, wherein the scanning comprises scanning synchronization signal blocks for physical cell identifiers of the candidate cell that are found in both at least one system information block neighbour cell list or range in an intersection of a set C3 or set C4 and a set M3 or set M4.

In accordance with the example embodiments as described in the paragraphs above, wherein based on interfrequency neighbouring physical cell identifier list or range: C4 denotes a list, range, or list of ranges of interfrequency neighbouring closed access group cells; and M4 denotes a list, range, or list of ranges of interfrequency neighbouring mobile integrated access and backhaul cells, wherein the scanning is performed for physical cell identifiers in the intersection of C4 and M4.

In accordance with the example embodiments as described in the paragraphs above, wherein based on intrafrequency neighbouring physical cell identifier list or range: C3 denotes a list, range, or list of ranges of intrafrequency neighbouring closed access group cells; and M3 denotes a list, range, or list of ranges of intrafrequency neighbouring mobile integrated access and backhaul cells, wherein the scanning is performed for physical cell identifiers in the intersection of C3 and M3.

In accordance with the example embodiments as described in the paragraphs above, wherein the apparatus is configured by the communication network with the one or more closed access group identifiers.

In accordance with the example embodiments as described in the paragraphs above, wherein there is, based on the scanning, determining a cell of the communication network as a candidate cell with system information to be decoded.

In accordance with the example embodiments as described in the paragraphs above, wherein there is, based on the determining, receiving from a cell of the communication network at least one system information block indicating the cell is a closed access group cell and a mobile integrated access and backhaul cell.

In accordance with the example embodiments as described in the paragraphs above, wherein there is, based on the receiving: decoding a system information block 1; detecting a cell of the communication network as a closed access group cell and mobile integrated access and backhaul in the list of ranges in the communication network; verifying that the closed access group identity of the detected cell is in a configured set of closed access group list or range of the apparatus; and based on the verifying reselecting a cell of the communication network, wherein the reselecting is not taking into account a dedicated frequency priority of the cell.

A non-transitory computer-readable medium (MEM 10B as in FIG. 3) storing program code (PROG 10C of as in FIG. 3), the program code executed by at least one processor (DP 10A as in FIG. 3) to perform the operations as at least described in the paragraphs above.

In accordance with an example embodiment of the invention as described above there is an apparatus comprising: means for determining (one or more transceivers 10D; MEM 10B; PROG 10C; and DP 10A as in FIG. 3) by an apparatus (UE 10 as in FIG. 3) information of a list of ranges in a communication network where at least one closed access group cell may be found and where at least one mobile integrated access and backhaul cell may be found; means for scanning (one or more transceivers 10D; MEM 10B; PROG 10C; and DP 10A as in FIG. 3) synchronization signal blocks for physical cell identifiers of a candidate cell that are found in both at least one system information block closed access group list or range and at least one system information block mobile integrated access and backhaul list or range; and means, based on the scanning, for decoding (one or more transceivers 10D; MEM 10B; PROG 10C; and DP 10A as in FIG. 3) system information at the candidate cell to verify that the candidate cell is a mobile integrated access and backhaul cell and a closed access group cell; and based on the decoding, enabling the apparatus to access the candidate cell for cell reselection.

In the example aspect of the invention according to the paragraph above, wherein at least the means for determining, scanning, and decoding comprises a non-transitory computer readable medium [MEM 10B as in FIG. 3] encoded with a computer program [PROG 10C as in FIG. 3] executable by at least one processor [DP 10A as in FIG. 3].

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

In accordance with example embodiments of the invention as disclosed in this application this application, the "circuitry" provided can include at least one or more or all of the following:
 (a) hardware-only circuit implementations (such as implementations in only analog and/or digital circuitry);
 (b) combinations of hardware circuits and software, such as (as applicable):
  (i) a combination of analog and/or digital hardware circuit(s) with software/firmware; and
  (ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and
 (c) hardware circuit(s) and or processor(s), such as a microprocessor(s) or a portion of a microprocessor(s), that requires software (e.g., firmware) for operation, but the software may not be present when it is not needed for operation."

In accordance with example embodiments of the invention, there is adequate circuitry for performing at least novel operations in accordance with example embodiments of the invention as disclosed in this application, this 'circuitry' as may be used herein refers to at least the following:
 (a) hardware-only circuit implementations (such as implementations in only analog and/or digital circuitry); and
 (b) to combinations of circuits and software (and/or firmware), such as (as applicable): (i) to a combination of processor(s) or (ii) to portions of processor(s)/software (including digital signal processor(s)), software, and memory (ies) that work together to cause an apparatus, such as a mobile phone or server, to perform various functions); and
 (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of example embodiments of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus, comprising:
   at least one processor; and
   at least one non-transitory memory storing instructions, that when executed by the at least one processor, cause the apparatus at least to:
   determine information of a list of ranges in a communication network where at least one closed access group cell may be found and where at least one mobile integrated access and backhaul cell may be found;
   scan synchronization signal blocks for physical cell identifiers of a candidate cell that are found in both at least one system information block closed access group list or range and at least one system information block mobile integrated access and backhaul list or range;
   based on the scanning, decode system information at the candidate cell to verify that the candidate cell is a mobile integrated access and backhaul cell and a closed access group cell; and
   based on the decoding, enabling the apparatus to access the candidate cell for cell reselection.

2. The apparatus of claim 1, wherein the determining is based on a broadcast of the information in at least one system information block from a cell of the communication network.

3. The apparatus of claim 1, wherein the scanning comprises scanning synchronization signal blocks for physical cell identifiers of the candidate cell that are found in both at least one system information block neighbor cell list or range in an intersection of a set C3 or set C4 and a set M3 or set M4.

4. The apparatus of claim 3, wherein based on interfrequency neighbouring physical cell identifier list or range:
   C4 denotes a list, range, or list of ranges of interfrequency neighbouring closed access group cells; and
   M4 denotes a list, range, or list of ranges of interfrequency neighbouring mobile integrated access and backhaul cells,
   wherein the scanning is performed for physical cell identifiers in the intersection of C4 and M4.

5. The apparatus of claim 3, wherein based on intrafrequency neighbouring physical cell identifier list or range:
   C3 denotes a list, range, or list of ranges of intrafrequency neighbouring closed access group cells; and
   M3 denotes a list, range, or list of ranges of intrafrequency neighbouring mobile integrated access and backhaul cells,
   wherein the scanning is performed for physical cell identifiers in the intersection of C3 and M3.

6. The apparatus of claim 3, wherein the apparatus is configured by the communication network with the one or more closed access group identifiers.

7. The apparatus of claim 1, wherein the at least one non-transitory memory storing instructions is executed by the at least one processor to cause the apparatus at least to:
   based on the scanning, determine a cell of the communication network as a candidate cell with system information to be decoded.

8. The apparatus of claim 7, wherein the at least one non-transitory memory storing instructions is executed by the at least one processor to cause the apparatus at least to:
   based on the determining, receive from a cell of the communication network at least one system information block indicating the cell is a closed access group cell and a mobile integrated access and backhaul cell.

9. The apparatus of claim 8, wherein the at least one non-transitory memory storing instructions is executed by the at least one processor to cause the apparatus at least to:
   based on the receiving:
   decode a system information block 1;
   detect a cell of the communication network as a closed access group cell and mobile integrated access and backhaul cell in the list of ranges in the communication network;
   verify that the closed access group identity of the detected cell is in a configured set of closed access group list or range of the apparatus; and
   based on the verifying, reselect a cell of the communication network, wherein the reselecting is not taking into account a dedicated frequency priority of the cell.

10. A method, comprising:
    determining by an apparatus information of a list of ranges in a communication network where at least one closed access group cell may be found and where at least one mobile integrated access and backhaul cell may be found;
    scanning synchronization signal blocks for physical cell identifiers of a candidate cell that are found in both at least one system information block closed access group list or range and at least one system information block mobile integrated access and backhaul list or range;
    based on the scanning, decoding system information at the candidate cell to verify that the candidate cell is a mobile integrated access and backhaul cell and a closed access group cell; and
    based on the decoding, enable the apparatus to access the candidate cell for cell reselection.

11. The method of claim 10, wherein the determining is based on a broadcast of the information in at least one system information block from a cell of the communication network.

12. The method of claim 10, wherein the scanning comprises scanning synchronization signal blocks for physical cell identifiers of the candidate cell that are found in both at least one system information block neighbor cell list or range in an intersection of a set C3 or set C4 and a set M3 or set M4.

13. The method of claim 12, wherein based on interfrequency neighbouring physical cell identifier list or range:
    C4 denotes a list, range, or list of ranges of interfrequency neighbouring closed access group cells; and
    M4 denotes a list, range, or list of ranges of interfrequency neighbouring mobile integrated access and backhaul cells,
    wherein the scanning is performed for physical cell identifiers in the intersection of C4 and M4.

14. The method of claim 12, wherein based on intrafrequency neighbouring physical cell identifier list or range:
    C3 denotes a list, range, or list of ranges of intrafrequency neighbouring closed access group cells; and
    M3 denotes a list, range, or list of ranges of intrafrequency neighbouring mobile integrated access and backhaul cells,
    wherein the scanning is performed for physical cell identifiers in the intersection of C3 and M3.

15. The method of claim 12, wherein the apparatus is configured by the communication network with the one or more closed access group identifiers.

16. The method of claim 10, wherein the at least one non-transitory memory storing instructions is executed by the at least one processor to cause the apparatus at least to:

based on the scanning, determine a cell of the communication network as a candidate cell with system information to be decoded.

17. The method of claim 16, comprising:
based on the determining, receive from a cell of the communication network at least one system information block indicating the cell is a closed access group cell and a mobile integrated access and backhaul cell.

18. The method of claim 17, comprising:
based on the receiving:
decoding a system information block 1;
detecting a cell of the communication network as a closed access group cell and mobile integrated access and backhaul in the list of ranges in the communication network;
verifying that the closed access group identity of the detected cell is in a configured set of closed access group list or range of the apparatus; and based on the verifying; and
reselecting a cell of the communication network, wherein the reselecting is not taking into account a dedicated frequency priority of the cell.

* * * * *